April 22, 1924.  
J. A. GALLAGHER ET AL  
1,491,603  
AUTOMATIC WHEEL LOCKING DEVICE FOR BAGGAGE AND EXPRESS TRUCKS  
Filed March 30, 1923    2 Sheets-Sheet 1
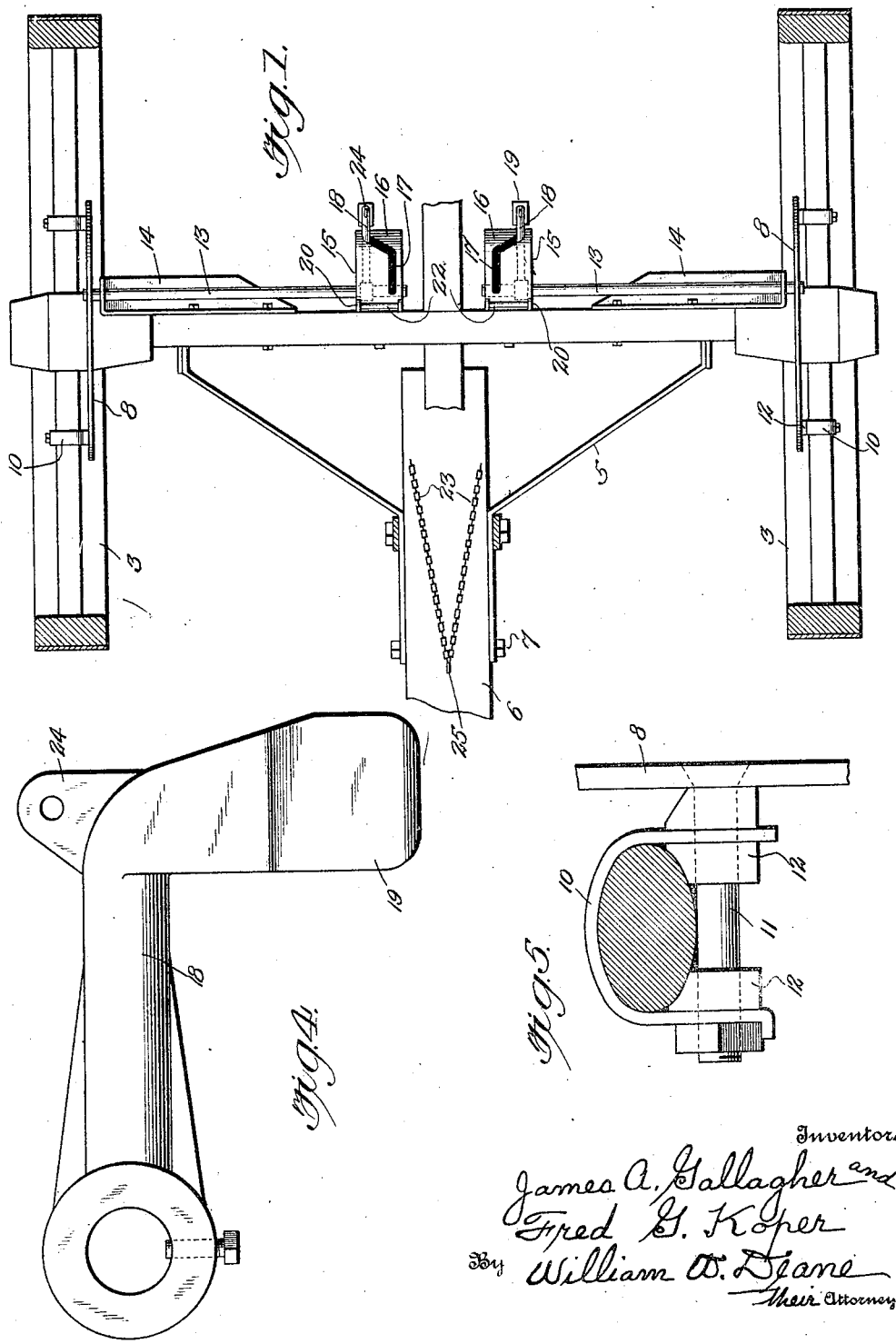

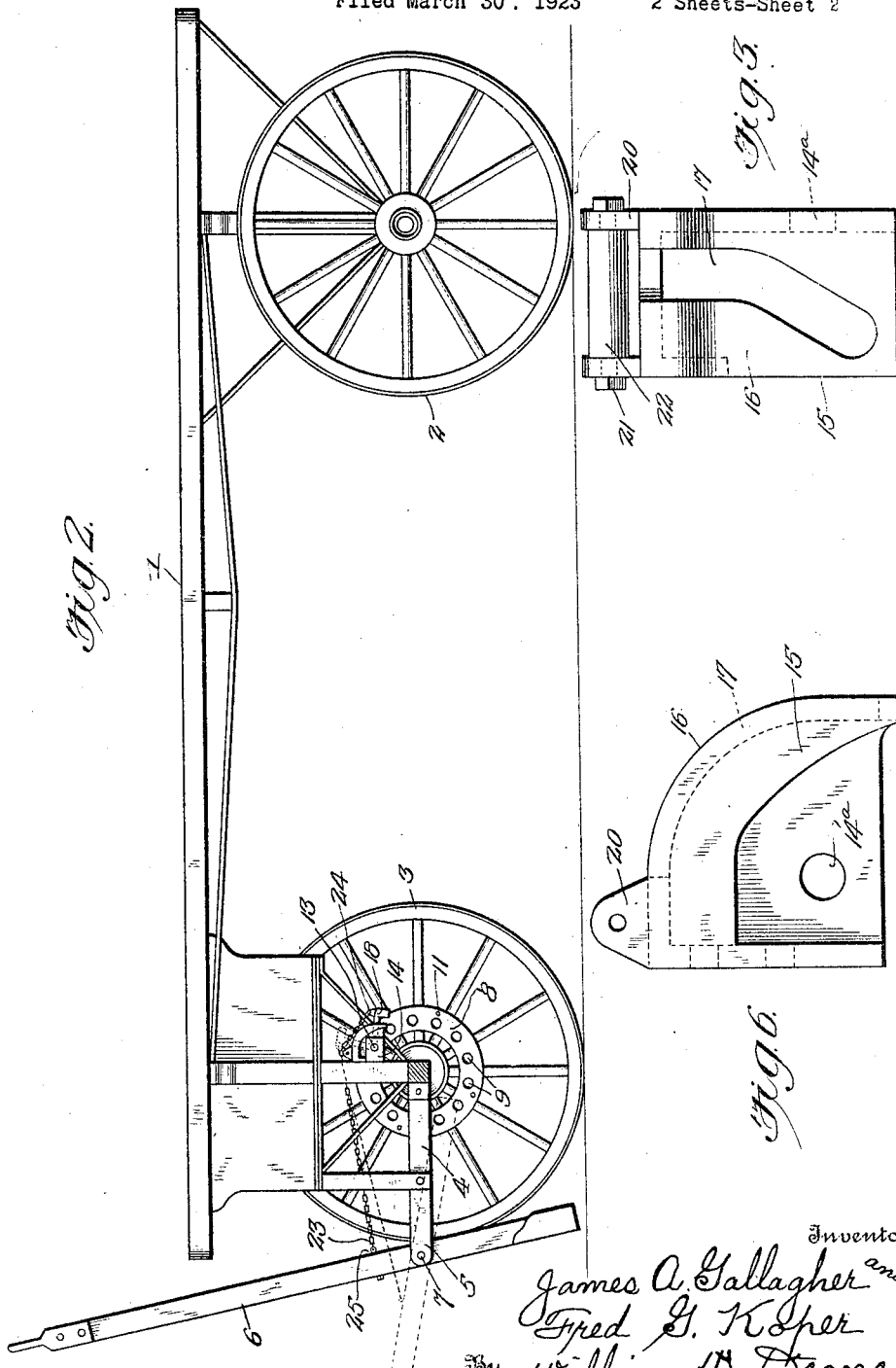

Patented Apr. 22, 1924.

1,491,603

UNITED STATES PATENT OFFICE.

JAMES A. GALLAGHER AND FRED G. KOPER, OF CHARLESTON, WEST VIRGINIA.

AUTOMATIC WHEEL-LOCKING DEVICE FOR BAGGAGE AND EXPRESS TRUCKS.

Application filed March 30, 1923. Serial No. 628,733.

*To all whom it may concern:*

Be it known that we, JAMES A. GALLAGHER and FRED G. KOPER, citizens of the United States, residing at Charleston, in the county of Kanawha and State of West Virginia, have invented certain new and useful Improvements in Automatic Wheel-Locking Devices for Baggage and Express Trucks, of which the following is a specification.

This invention relates to improvements in vehicle brakes and more particularly to an automatic wheel locking device for baggage and express trucks.

It is well known that baggage trucks and the like are set in motion by wind or by the vibration caused by moving trains, etc., and this in some instances has caused wrecks, as the truck rolled in front of a moving train or over an embankment, etc.

It is the primary object of the present invention to furnish improved means which will automatically lock the truck against movement, as soon as the truck operator releases the handle of the latter.

With the foregoing objects outlined and with other objects in view which will appear as the description proceeds, the invention consists in the novel features hereinafter described in detail, illustrated in the accompanying drawing and more particularly pointed out in the appended claims.

Referring to the drawings:

Figure 1 is a top plan view of a portion of a baggage truck with the platform removed for the purpose of clearness.

Fig. 2 is a side view with the near front wheel removed.

Fig. 3 is a face view of one of the cam castings employed in the construction.

Fig. 4 is a side elevation of one of the lugs or levers actuated by the cam for throwing one of the bolts.

Fig. 5 is a detail view illustrating the means for securing one of the locking disks to the wheel of the truck.

Fig. 6 is a side view of one of the cam castings.

In the drawing, 1 designates a baggage truck platform mounted on the rear wheels 2 and front steering wheels 3. The front steering wheels are mounted on an axle carried by a steering frame 4, and this steering frame carries an extension 5 to which the tongue 6 is pivotally connected at the point 7. Each of the front wheels is provided with a locking disk or ring 8 having a series of apertures 9. These disks are secured to the wheels by straps 10 having apertures for the reception of the bolts 11. These bolts pass through the disks and straps, and also through cast fillers or spacers 12.

The apertures of the disks are arranged to receive the sliding bolts 13 which are guided at their outer ends by angle plates 14 secured to the steering frame. The inner ends of the bolts slidably engage the apertures 14$^a$ of the cam castings 15. Each of these cam castings is secured to the steering frame and has a curved surface 16 provided with a cam slot 17 through which passes a lever 18. This lever is shown in detail in Fig. 4 and it is apertured to receive the bolt 13 with which it cooperates. The apertured end of the lever is fixedly secured to the bolt with which it cooperates, and the other end of the lever is weighted as shown at 19, so that the lever normally tends to occupy the position shown in Fig. 2, that is, the position in which it causes the bolt with which it cooperates, to project into one of the apertures 9 of the locking disk.

Each cam casting is provided at its upper end with a pair of ears 20 to receive a bolt 21 carrying a roller 22.

A chain 23 passes over the roller 22, has one of its ends secured to each operating lever at the point 24 and its opposite end secured to the tongue at the point 25.

In operation, the operator pulls the tongue 6 downwardly and this causes the chains 23 to raise the operating levers 18. As the operating levers rise, they move toward one another in travelling along the cam slots, and consequently the bolts are withdrawn from the holes of the locking disks.

On the other hand, if the tongue is released, the weights on the operating levers and tongue will cause the tongue to rise and the bolts to be projected outwardly into engagement with the apertures of the locking disks.

While the present construction has been devised particularly for use with baggage trucks, it is obvious that its use is not restricted to this application, as the same mechanism may be employed wherever it is necessary to lock a wheel against movement.

From the foregoing it is believed that the construction, operation and advantages of the invention may be readily understood and it is apparent that changes may be made in the details disclosed without departing from the spirit of the invention as expressed in the claims.

What is claimed and desired to be secured by Letters Patent is:

1. The combination with a wheel provided with locking apertures, of a bolt cooperating with said apertures to lock the wheel against movement, a lever operatively connected to said bolt, and a cam casting having a cam slot in which said lever operates.

2. A combination as claimed in claim 1 in which the lever is provided with means tending constantly to move the same in one direction.

3. A combination as claimed in claim 1 in which the lever is provided with a weight tending constantly to move the same in one direction.

4. A combination as claimed in claim 1 in which the lever is provided with means tending constantly to move the same in one direction, and manually operated means for moving the lever in the opposite direction.

5. A combination as claimed in claim 1 including a tongue, and means connecting said tongue to said lever, whereby when the tongue is moved in one direction said lever will be operated to actuate said bolt.

6. A truck including a supporting wheel provided with locking apertures, a bolt engageable with said apertures for locking the wheel against movement, a lever connected to said bolt, a cam casting provided with a cam slot in which the lever moves for causing movement of said bolt, a tongue for said truck, and means connecting said tongue to said lever, whereby when the tongue is moved in one direction the lever will operate to move the bolt in one direction.

7. A truck as claimed in claim 6 in which the lever is provided with means tending normally to move the same in one direction.

8. The combination with a truck having a tongue, of aperture disks connected to the wheels of said truck, sliding bolts engageable with said apertures for locking the wheels against movement, levers connected to said bolts and provided with means for normally moving the levers in one direction, cam castings provided with cam slots, in which said levers operate, and means connecting said levers to said tongue, whereby when the tongue is swung in one direction, said levers will be forced to actuate said bolts.

In testimony whereof we affix our signatures.

JAMES A. GALLAGHER. [L. S.]
FRED G. KOPER. [L. S.]